Nov. 22, 1966 R. E. MIERENDORF 3,287,573
PULSE GENERATOR CIRCUIT FOR PROVIDING LINEAR ADVANCING OR RETARDING OF PULSE GENERATION BY MAGNITUDE OF INPUT SIGNAL
Filed March 9, 1964 2 Sheets-Sheet 1
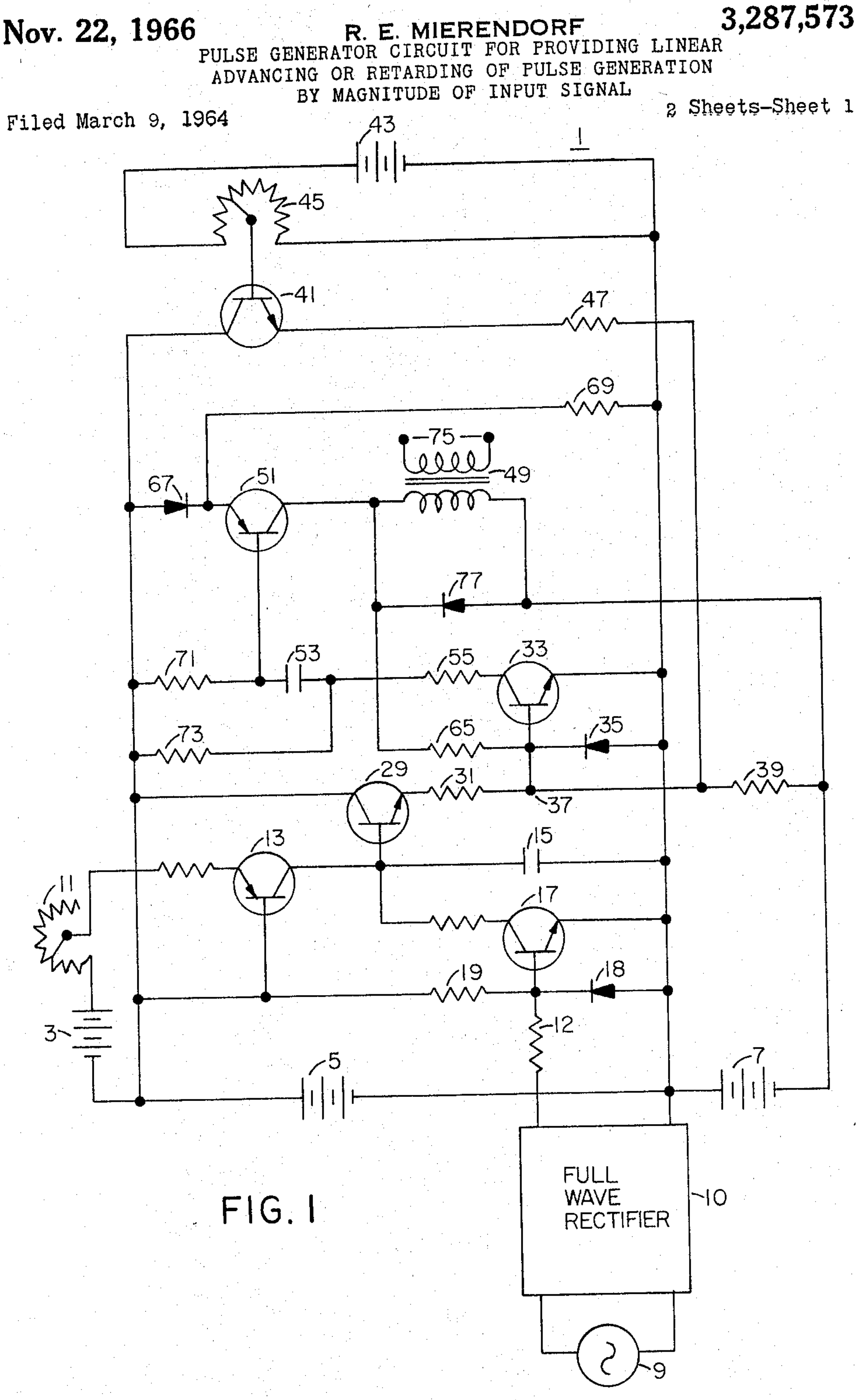
FIG. I
INVENTOR
ROBERT E. MIERENDORF
BY Daniel D. Fetterley
ATTORNEY Nov. 22, 1966 R. E. MIERENDORF 3,287,573

PULSE GENERATOR CIRCUIT FOR PROVIDING LINEAR ADVANCING OR RETARDING OF PULSE GENERATION BY MAGNITUDE OF INPUT SIGNAL

Filed March 9, 1964 2 Sheets-Sheet 2

INVENTOR
ROBERT E. MIERENDORF
BY Daniel D. Fetterley
ATTORNEY 3,287,573

PULSE GENERATOR CIRCUIT FOR PROVIDING LINEAR ADVANCING OR RETARDING OF PULSE GENERATION BY MAGNITUDE OF INPUT SIGNAL

Robert E. Mierendorf, Milwaukee, Wis., assignor to The Louis Allis Company, Milwaukee, Wis., a corporation of Wisconsin Filed Mar. 9, 1964, Ser. No. 350,470
4 Claims. (Cl. 307—88.5)

The present invention relates to pulse generators, and more particularly to an improved pulse generator circuit for controlling the generation of pulses in accordance with an input signal.

It is a general object of the present invention to provide a new and improved pulse generator circuit wherein the instant of pulse generation may be advanced or retarded in accordance with an input signal.

Another object of this invention is to provide a new and improved pulse generator circuit wherein the instant of pulse generation is advanced or retarded linearly in accordance with the magnitude of the input signal.

Yet another object of this invention is to provide an improved pulse generator which is simple in design, operation and maintenance, and which is capable of substantially trouble-free operation for a substantial period.

A specific object of this invention is to provide a pulse generator circuit wherein the instant of pulse generation may be advanced or retarded in accordance with an input signal by providing a means for generating a saw-tooth current; means, responsive in part to the input signal, producing currents opposing and increasing the saw-tooth current; transistor means, capable of being turned on by the sum of the aforementioned currents, to provide current to a pulse transformer; positive feedback from said pulse transformer to provide a steep-wave front to the current provided thereto; and means to turn off the transistor means when a short pulse of current has been generated in the pulse transformer.

A pulse generator circuit of the type described and claimed in this patent finds utility in numerous industrial applications. For example, it may be desired to increase or decrease a firing angle of pulse-fired controlled rectifiers to increase or decrease their output in accordance with the signal representing the difference between a reference signal and a feedback signal so as to provide control to an industrial apparatus.

Further advantages and features of the present invention relate to the particular arrangement and structure whereby the above identified and other objects of the invention are obtained. The invention, both as to its structure and mode of operation, will be better understood by reference to the following specification and drawings, forming a part thereof, wherein:

FIGURE 1 is a schematic diagram of one embodiment of the improved pulse generator circuit in accordance with the present invention;

Figure 4A:
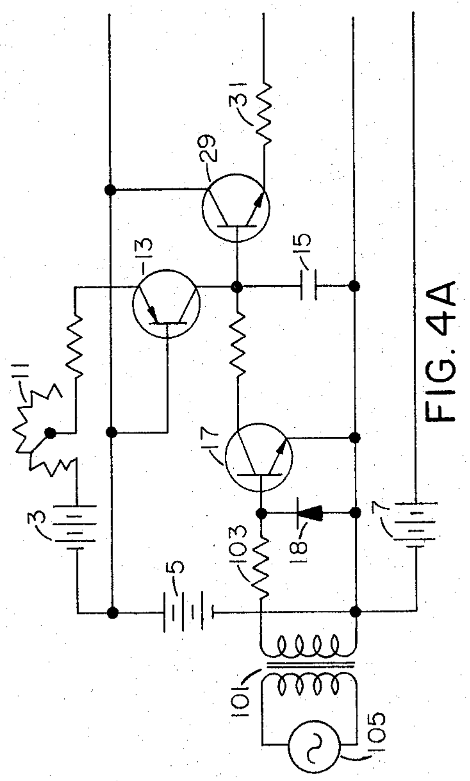
FIGURE 4A is another embodiment of the improved pulse generator circuit in accordance with the present invention.

Referring now to FIGURE 1, the numeral 1 indicates an improved pulse generator circuit constructed in accordance with the teachings of the invention contained in this patent. Pulse generator 1 is powered by a direct current supply, shown illustratively as batteries 3, 5 and 7, and a source of full wave rectified alternating current, shown illustratively as alternating current source 9 and full wave rectifier 10. Current is supplied from batteries 3 and 5, through rheostat 11 and the emitter-collector circuit of transistor 13, to charge capacitor 15. Transistor 13, connected in a common base configuration, provides a constant charging current to capacitor 15, permitting capacitor 15 to charge linearly. The amount of time required to charge capacitor 15 is determined by the setting of rheostat 11.

A low impedance bypass around capacitor 15 is provided by transistor 17 when that transistor is in the conducting state. Battery 5 produces a signal through resistor 19, tending to turn on transistor 17 to provide the low impedance by-pass around capacitor 15 and prevent capacitor 15 from charging. Full wave rectifier 10 provides a signal in opposition to the signal from resistor 19. This signal circulates through diode 18 and reverse-biases transistor 17 into the non-conducting state.

Figure 2:
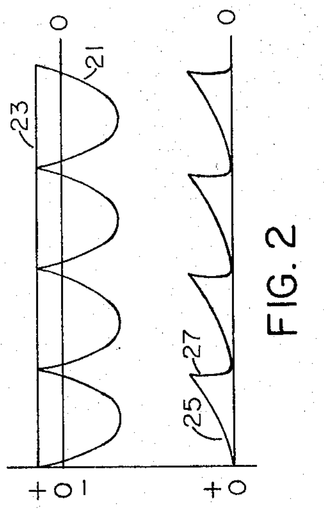
FIGURE 2 is a graph showing conditions existing in the circuit of FIGURE 1.

Referring to FIGURE 2, the current output of full wave rectifier 10, through current limiting resistor 12, is indicated by the graph 21, while the current from battery 5 through resistor 19 is indicated by the graph 23. As described above and shown in FIGURE 2, the current 23 from battery 5 is constant and in a direction to turn transistor 17 on, while the current output of full wave rectifier 9 is a fully rectified alternating current tending to turn off transistor 17. As long as fully rectified alternating current 21 is greater than the constant current through resistor 19, transistor 17 will be in the non-conducting state and capacitor 15 will charge linearly as shown by the graph 25. At the end of each half-cycle of A.C., when such current approaches zero, the constant current through resistor 19 predominates; and transistor 17 is turned on, allowing capacitor 15 to discharge therethrough as shown by the graph 27. The combined graph of 25 and 27 shows the saw-tooth voltage waveform produced by a periodic charging and discharging of capacitor 15 in response to the conduction state of transistor 17.

Transistor 29 is connected in a common collector or emitter follower configuration to present a high impedance input to the output of capacitor 15 to prevent the loading thereof. The operation of transistor 29 provides a current signal through resistor 31, which is identical in form to the saw-tooth voltage produced across capacitor 15. The current signal through resistor 31 flows through the base-emitter terminals of transistor 33. Battery 7 produces a current signal through rectifier 35, wiring junction 37 and resistor 39, in a direction to oppose the saw-tooth current through resistor 31 at junction 37.

A third signal is provided to wiring junction 37 by transistor 41 and resistor 47. An adjustable input signal is provided to pulse generator circuit 1 through the base terminal of transistor 41. The production of this signal is shown diagrammatically in FIGURE 1 by battery 43 and potentiometer 45. It will be understood that the adjustable input signal could be, for instance, an apparatus control signal such as the difference between a reference signal and an apparatus feedback signal. The input signal is fed from transistor 41 through current limiting resistor 47 to wiring junction 37, in a direction to aid the saw-tooth current through resistor 31 in turning on transistor 33.

The primary winding of pulse transformer 49 is connected in series with rectifier 67, the emitter-collector terminals of transistor 51, and the aforesaid three elements connected in series across batteries 5 and 7. Transistor 51 allows current to flow through the primary winding of pulse transformer 49 only when transistor 51 is in the conducting state. The base terminal of transistor 51, which controls the state of conduction or non-conduction of transistor 51, is connected through capacitor 53 and resistor 55 to the collector terminal of transistor 33. Thus, if transistor 33 is in the conducting state, a base current will flow through transistor 51, allowing transistor 51 to assume the conducting state until capacitor 53 becomes charged. The charging of capacitor 53 eliminates the base current flow from transistor 51, causing that transistor to turn off. Hence, the conduction state of transistor 51 is dependent upon the conduction state of transistor 33 and the voltage across capacitor 53.

Figure 3:
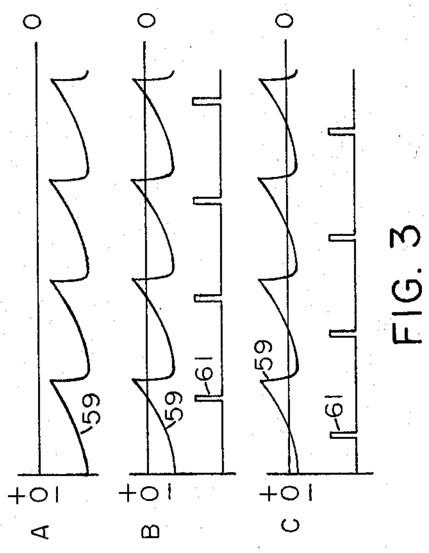
FIGURE 3 is another graph showing conditions existing in the circuit of FIGURE 1.

The conduction state of transistor 33 is determined by the relative magnitudes of the saw-tooth current through resistor 31, the current in opposition thereto from battery 7 through current limiting resistor 39, and the input signal from transistor 41 through resistor 47. The interaction of these currents may be seen by reference to FIGURE 3. This figure shows the magnitude and direction of the combined current signal from wiring junction 37 applied to the base terminal of transistor 33. A positive current signal from junction 37 will bias on transistor 33, shown as an NPN type transistor in FIGURE 1, while a negative current signal applied to the base of that transistor will reverse-bias or turn off transistor 33.

FIGURE 3A shows the magnitude and direction of the base current signal 59, from junction 37, to transistor 33 when there is no input signal to pulse generator 1 at the base terminal of transistor 41. Under these conditions, the magnitude of the current from battery 7 exceeds the saw-tooth current at all times. Hence, the combined current signal 59 supplied to the base terminal of transistor 33 is a continuously negative current signal. This prevents transistor 33 from turning on. Transistor 51 is prevented from turning on because of the lack of a base signal path, and current may not flow through pulse transformer 49.

FIGURE 3B is a graph, similar to FIGURE 3A, showing operating conditions in pulse generator 1 when a small input signal is applied to junction 37, via transistor 41 and resistor 47, to aid the saw-tooth current through resistor 31. In this instance, the input signal and the saw-tooth current will exceed the back-biasing current from battery 7 periodically, due to the peaks of the saw-tooth current. When the combined input signal and saw-tooth current signal exceeds the current from battery 7, a positive current signal is applied from junction 37 to the base terminal of transistor 33, and transistor 33 will begin to conduct.

When transistor 33 assumes the conducting state, a base current path is provided for transistor 51 through the collector-emitter terminals of transistor 33. This turns transistor 51 to the conducting state and allows current flow through the primary winding of transformer 49. A signal is taken from the primary winding of transformer 49 through resistor 65 to junction 37. This signal is in the nature of a positive feedback signal, and aids in turning on transistor 33 abruptly when a positive current signal is applied to the base terminal thereof, assuring a steep front to the current appearing in the primary winding of transformer 49. The base current in transistor 51 continues to flow until capacitor 53 becomes charged. At this point, the base current of transistor 51 ceases and transistor 51 assumes the non-conducting state, shutting off current to the primary winding of transistor 49. Capacitor 53 is selected to be of small capacitance and will allow transistor 51 to remain on only for a short period of time, producing a short pulse of current 61 in the primary winding of transformer 49 and hence, the output terminals 75 of pulse generator 1. Diode 77 provides for the resetting of pulse transformer 49.

Transistor 51 is held in the non-conducting state by a small current through diode 67 and resistor 69, which produces a small voltage drop across the diode 67, holding the emitter terminal of transistor 51 slightly more negative than the base terminal, thereby preventing conduction. Capacitor 53 discharges through resistors 71 and 73 when transistor 33 is in the non-conducting state, rendering it rechargeable to generate another firing pulse the next time the peak of the input signal-saw-tooth current combination exceeds the back-biasing current from battery 7.

FIGURE 3C shows circuit conditions when a larger input signal is provided to wiring junction 37. The instant at which a positive current signal is provided to the base terminal of transistor 33 occurs earlier in the generation of the saw-tooth current, due to the increased input signal. This allows transistor 33 to assume the conducting state earlier, and thus advances the point at which a pulse 61 is generated, as described above.

Figure 4B:
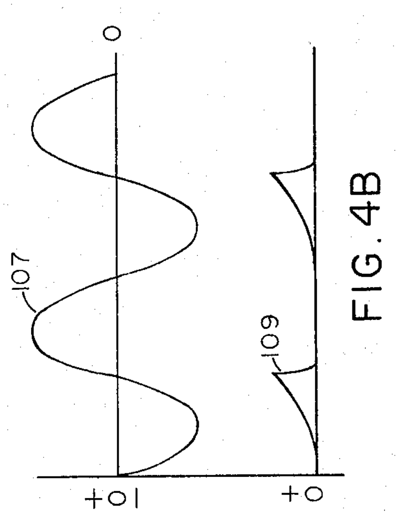
FIGURE 4B is a graph showing conditions existing in the circuit of FIGURE 4A.

FIGURE 4A shows a portion of pulse generator circuit 1, including a different embodiment thereof. Transformer 101 provides an alternating current signal from alternating current source 105, through current limiting resistor 103, to the base-emitter terminals of transistor 17. Graph 107 in FIGURE 4B describes the alternating current signal applied to the base terminal of transistor 17. When the base current signal 107 is negative with respect to the emitter, transistor 17 will be in the non-conducting state, as a positive current signal is required to turn on the NPN transistor shown in FIGURE 4A. This allows capacitor 15 to be charged by the current through transistor 13. When, however, the signal 107 applied to the base terminal of transistor 17 is positive with respect to the emitter of transistor 17, the transistor will be in the conducting state and capacitor 15 will discharge therethrough. The alternating current signal 107 applied to the base terminal of transistor 17 produces the voltage signal across capacitor 15, shown by the graph 109. This saw-tooth voltage signal may be applied through transistor 29 to resistor 31 and used in the same manner as the saw-tooth current signal described in connection with FIGURE 2. Utilization of the circuit shown in FIGURE 4A permits simplification of pulse generator circuit 1 by elimination of resistor 19 and by substituting transformer 101 and resistor 103 for full wave rectifier 9 in applications requiring a fewer number of pulses to be generated by pulse generator 1.

It is to be understood that other modifications and variations may be made to the pulse generator circuit described herein by those skilled in the art, without departing from the scope of the invention; and it is intended to cover in the appended claims all such variations and modifications as fall within the true spirit and scope of the invention.

What is claimed is:

1. A pulse generator circuit wherein the point of pulse generation may be advanced or retarded in accordance with the magnitude of an input signal comprising:
   - (a) a power supply;
   - (b) a pulse transformer having input terminals, connected to said power supply;
   - (c) first transistor means connected to said pulse transformer to provide current thereto from said power supply when said first transistor means is in the on state;
   - (d) means connected to said first transistor means to turn on said first transistor means comprising,
     - second transistor means connected to said first transistor means to turn on said first transistor means when said second transistor means is in the conducting state,
     - means connected to said second transistor means to provide a saw-tooth current signal tending to place said second transistor means in the conducting state,
     - means connected to said second transistor means to provide a constant current signal tending to place said second transistor means in the non-conducting state,
     - means responsive to the input signal connected to said second transistor means to provide a signal proportional to the input signal to combine with said saw-tooth current signal to produce a signal to overcome said constant current signal to place said second transistor means in the conducting state when said combined signal exceeds said constant current signal, and means connected to said second transistor means and to said pulse transformer to provide rapid turn-on of said second transistor means when current appears in said transformer; and (e) means connected to said first transistor means to turn off said first transistor means after a short pulse of current has been generated at the output terminals of said transformer.

2. The pulse generator of claim 1 wherein the means connected to said second transistor means to provide a saw-tooth current signal tending to place said second transistor means in the conducting state comprises:

(a) a capacitor;

(b) means connected to said capacitor to produce a constant current to charge said capacitor;

(c) a transistor connected to said capacitor to provide a discharge path therefor when in the conducting state;

(d) means connected to said transistor producing a current signal to urge said transistor into the conducting state;

(e) means connected to said transistor producing a fully rectified alternating current signal to urge said transistor into the non-conducting state, whereby said capacitor is periodically charged by said constant current when said fully rectified alternating current signal urging said transistor into the non-conducting state exceeds said current signal urging said transistor into the conducting state, and discharged when said fully rectified alternating current signal is less than said signal urging said transistor into the conducting state to form a saw-tooth voltage signal; and (f) a transistor connected in emitter follower configuration to said capacitor to provide a saw-tooth current signal tending to place said second transistor means in the conducting state.

3. The pulse generator of claim 1 wherein the means connected to said first transistor means to turn off said first transistor means after a short pulse of current has been generated comprises:

(a) a capacitor to interrupt current flow through said first transistor means when said capacitor becomes charged, thereby turning off said first transistor means;

(b) means to discharge said capacitor when said first transistor means is turned off; and (c) means to reverse-bias said first transistor means to prevent turn-on when said capacitor becomes discharged.

4. The pulse generator of claim 1 wherein the means connected to said second transistor means to provide a saw-tooth current signal tending to place said second transistor means in the conducting state comprises:

(a) a capacitor;

(b) means connected to said capacitor to produce a constant current to charge said capacitor;

(c) a transistor connected to said capacitor to provide a discharge path therefor when in the conducting state;

(d) means connected to said transistor producing a alternating current signal to alternately urge said transistor into the non-conducting and conducting states, whereby said capacitor is periodically charged by said constant current when said transistor is in the non-conducting state, and discharged when said transistor is in the conducting state, forming a saw-tooth voltage signal; and (e) a transistor connected in emitter follower configuration to said capacitor to provide a saw-tooth current signal tending to place said second transistor means in the conducting state.

No references cited.

ARTHUR GAUSS, *Primary Examiner.*

S. D. MILLER, *Assistant Examiner.*